No. 775,451. Patented November 22, 1904.

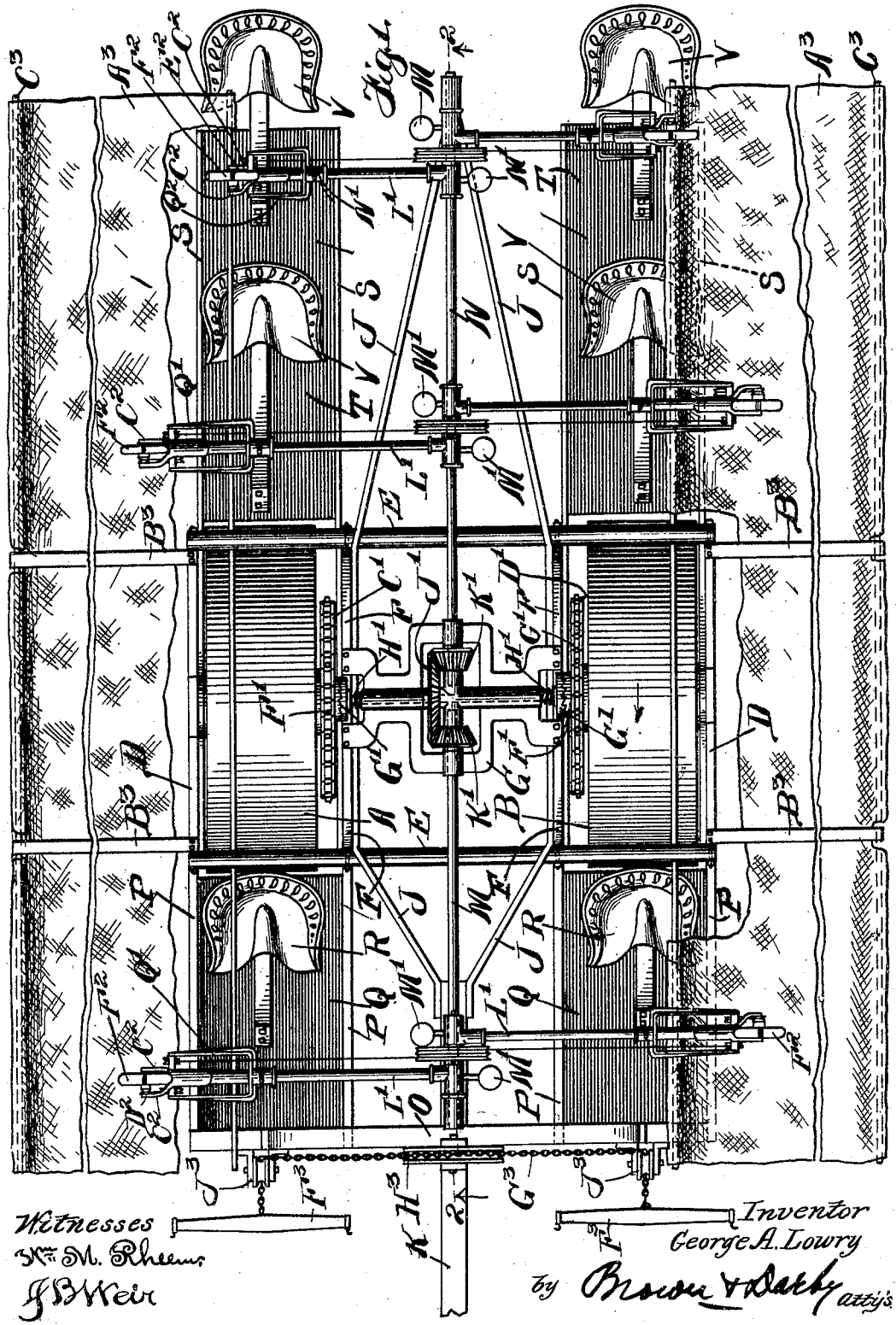

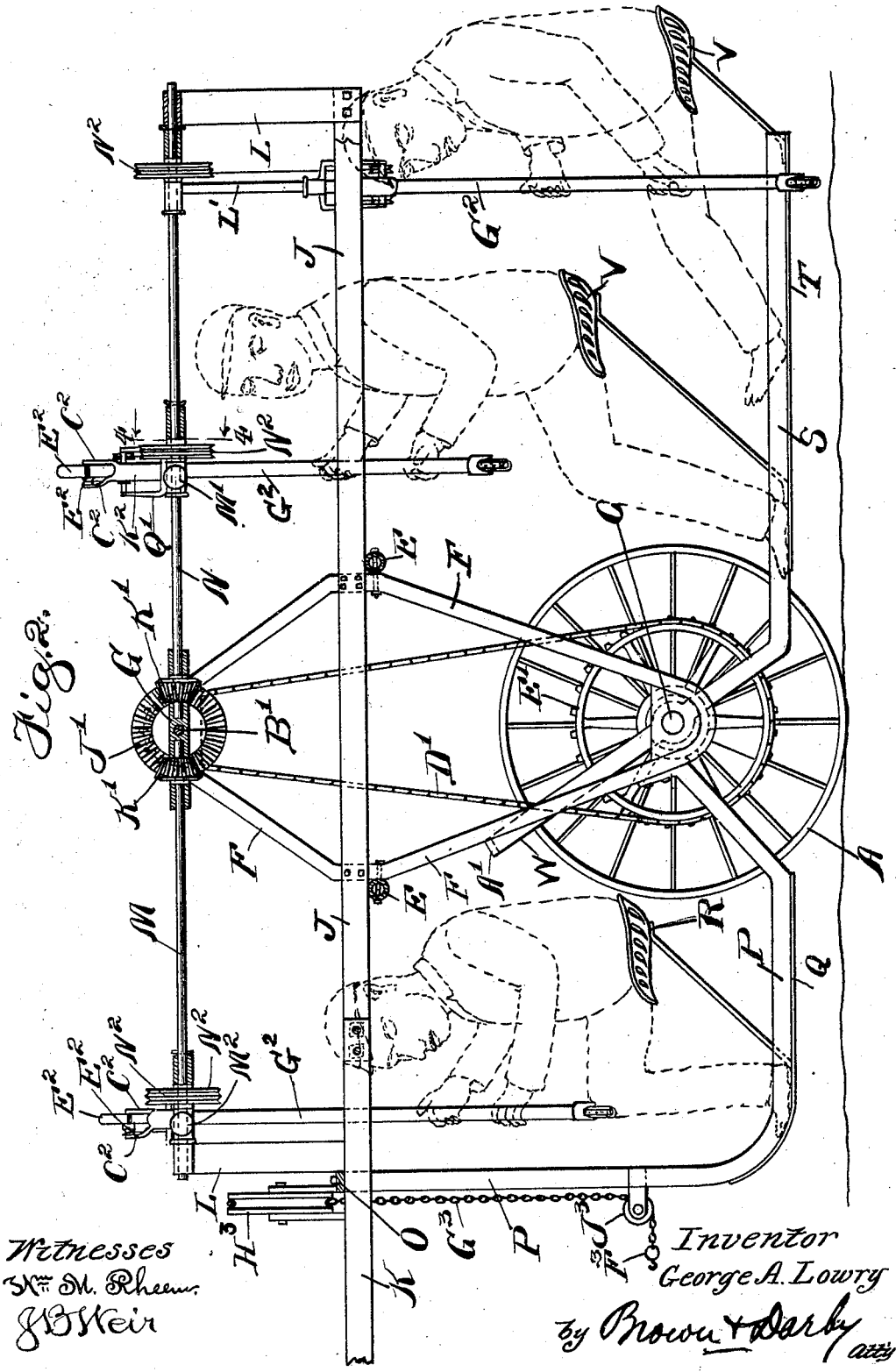

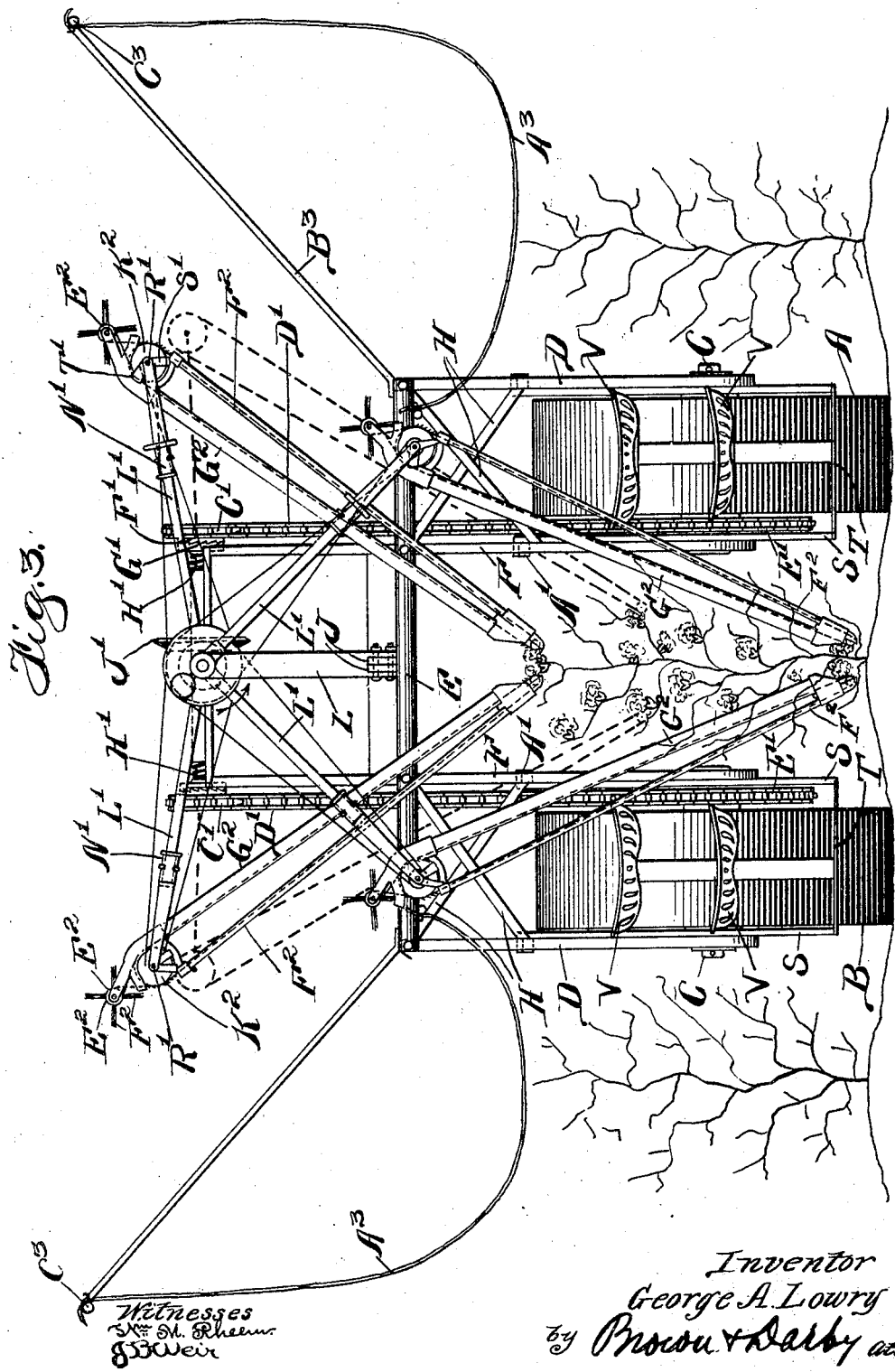

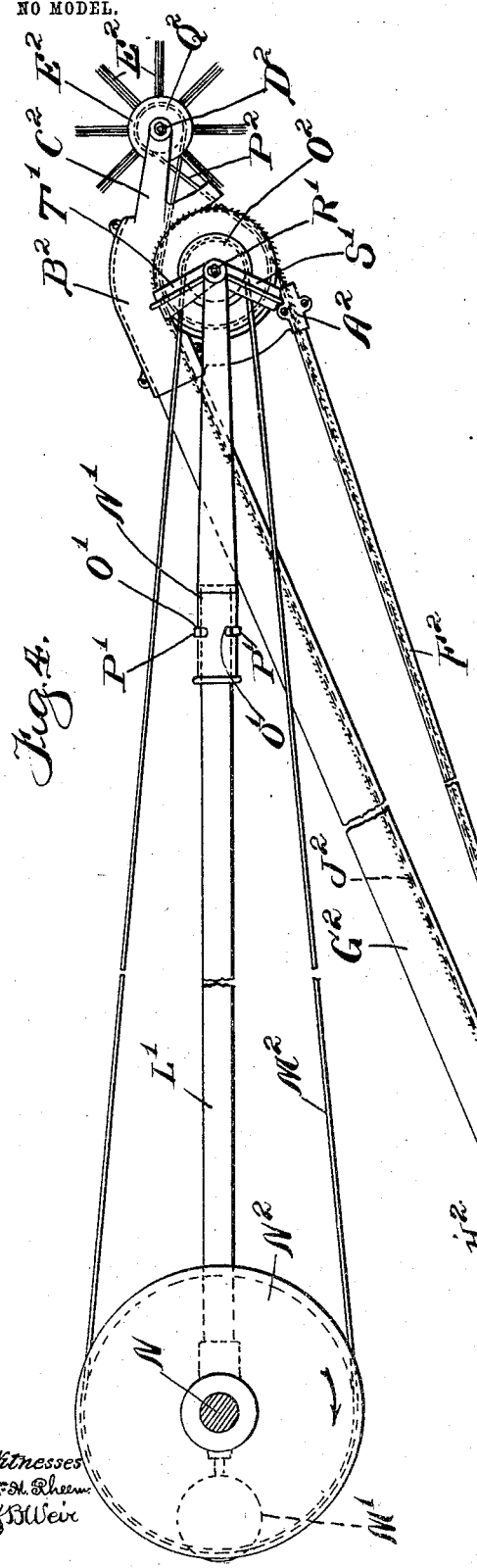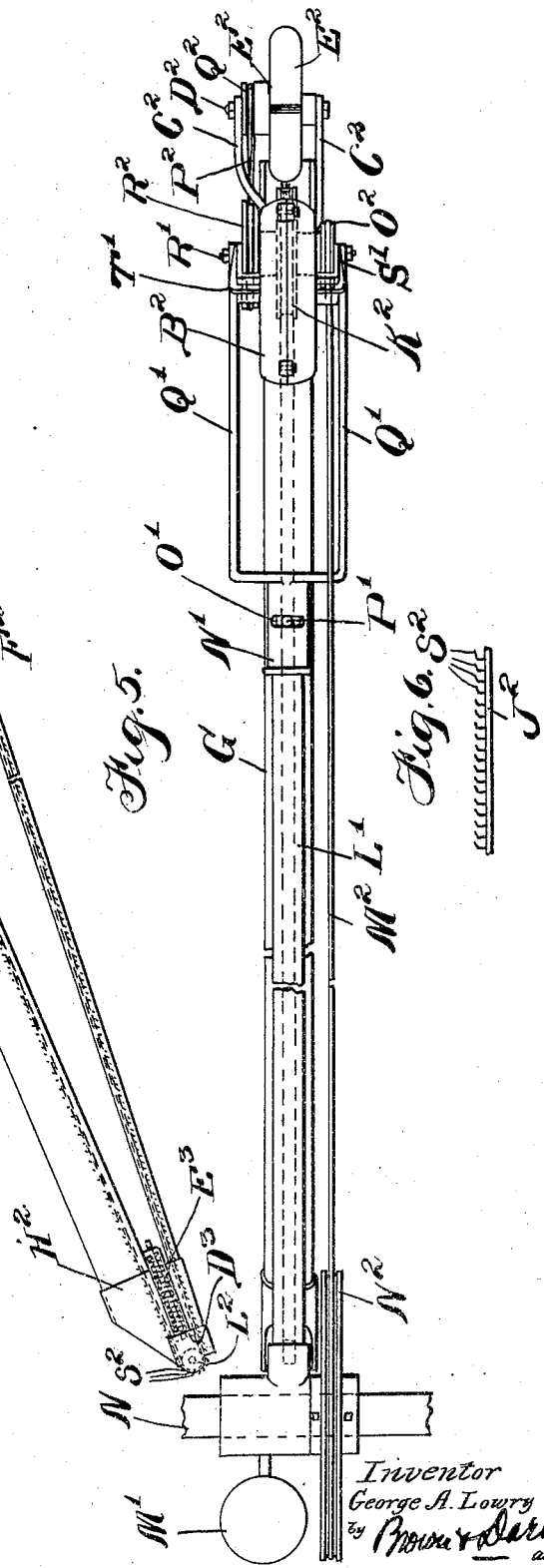

UNITED STATES PATENT OFFICE.

GEORGE A. LOWRY, OF BOSTON, MASSACHUSETTS, ASSIGNOR TO THE COTTON PICKER COMPANY, A CORPORATION OF MAINE.

COTTON-PICKING MACHINE.

SPECIFICATION forming part of Letters Patent No. 775,451, dated November 22, 1904.

Application filed April 9, 1904. Serial No. 202,420. (No model.)

*To all whom it may concern:*

Be it known that I, GEORGE A. LOWRY, a citizen of the United States, residing at Boston, in the county of Suffolk and State of Massachusetts, have invented a new and useful Cotton-Picking Machine, of which the following is a specification.

This invention relates to cotton-picking machines.

The object of the invention is to provide a machine for picking cotton which is simple in construction and efficient in operation.

A further object of the invention is to provide a machine for picking cotton which may be driven or propelled through a cotton-field and which is provided with power-driven devices controllable so as to be directed to any desired point of application to effect a picking or gathering of cotton from a stalk as the machine progresses through the field.

A further object of the invention is to provide a cotton-picking machine adapted to be progressed through a field wherein only the cotton which has opened is picked or gathered and without injury to the plant or unopened bolls.

A further object of the invention is to provide a machine adapted to be driven or propelled through a field and provided with power-driven dirigible devices for picking and gathering the opened cotton.

A further object of the invention is to provide a machine of the character referred to having a plurality of dirigible power-driven devices and mechanisms adapted to be directed to the proper points to secure a gathering or picking of the opened cotton of each plant over or past which the machine is progressed and without injuring the plant or unopened bolls thereon.

Other objects of the invention will appear more fully hereinafter.

The invention consists, substantially, in the construction, combination, location, and relative arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in top plan of a machine embodying the principles of my invention. Fig. 2 is a view in vertical central longitudinal section on the line 2 2 of Fig. 1 looking in the direction of the arrows. Fig. 3 is a view in rear elevation of the machine shown in Figs. 1 and 2. Fig. 4 is a detached detail view of one of the dirigible picking devices embraced within the spirit and scope of my invention, the drive-shaft therefor being shown in transverse section on the line 4 4, Fig. 2, looking in the direction of the arrows. Fig. 5 is a top plan view of the construction shown in Fig. 4. Fig. 6 is a detached broken detail view of a form of the picking or gathering belt adapted for use in connection with my invention.

The same part is designated by the same reference-sign wherever it occurs throughout the several views.

In the art of picking or gathering cotton through the operation of mechanical appliances it has been proposed to provide machines adapted to be propelled or progressed through a field of cotton and having devices designed to engage the opened cotton and to pick or gather the same. In the operation of such machines and apparatus, however, and especially where the gathering or picking devices are not dirigible nor controlled as to the point of application thereof to the cotton-stalk, such devices operate on the hit-or-miss principle, a sufficient number thereof being provided and arranged in such relative positions as to practically cover the entire height of the cotton-stalk. The result, however, is disastrous to the plant and to any unopened bolls of cotton thereon, for, as is well known, all the cotton-bolls contained upon a cotton-stalk do not open simultaneously, and if a machine such as has heretofore been proposed in the art is driven or propelled through a field in which all the cotton-bolls have not opened the unopened bolls as well as the plant, as above indicated, are injured and destroyed, thereby resulting in waste and loss of a material part of the cotton, and if the machine is not employed until all the cotton is opened the exposure of the cotton first opened to the elements results in injury by reason of such exposure to the fiber of the cotton, as well as to its appearance and value. Moreover, in machines of this nature and operating upon the principle indicated the gathering or picking devices not only operate to gather the opened cotton where such devices happen to be brought into contact therewith, but also to gather along with the cotton dried leaves, sticks, dirt, grit, or the like, the presence of which in the gathered cotton is a detriment, as it lowers the grade of the cotton and commands a smaller price in the market than would be the case with cotton free from such leaves, sticks, or the like. It has also been proposed in the prior art to employ hand devices adapted to be borne by hand individually and manually operated, whereby an operator progressing through a field is enabled to direct the hand-operated device carried by him to the proper point for picking or gathering the cotton. Such devices, however, entail not only the labor of operating, but also the labor of carrying the gathering devices, as well as the material gathered, and which requirements render such hand-operated or manual devices impractical and of little or no value.

It is among the special purposes of my present invention to provide a machine adapted to be driven or propelled through a field and carrying power actuated or driven gathering or picking mechanisms capable of being directed by an attendant, also carried by the machine, toward the particular points or positions on a cotton-plant where open cotton occurs, so as to pick or gather only the opened cotton, such devices being so controlled that the attendant is enabled to direct their operation to the desired points without danger of injury to the plant or to the unopened bolls carried thereon. It is also among the special purposes of my invention to provide an apparatus of the class and nature referred to wherein the gathering or picking devices may be so directed by the operator as to avoid collecting dried leaves, sticks, dirt, or the like, and wherein if such dried leaves, sticks, dirt, or the like should become engaged by the gathering or picking devices they are freed or expelled from the cotton before delivery into the receptacle arranged to receive the same from such picking or gathering devices. In a word, it is among the special purposes of my present invention to avoid the defects and objections existing in power-actuated mechanism heretofore employed in this connection, such as above noted, and also to relieve the operator of the work of carrying the picking or gathering devices or driving the same, as well as of the labor of carrying the gathered product, thereby enabling the attendant to give his whole time to the work of directing the gathering and picking mechanisms to the proper point to gather or pick only the opened cotton, and in carrying out my invention I propose to provide each machine with a plurality of such picking or gathering mechanisms, whereby as the machine progresses through the field gathering or picking devices may be directed toward opposite sides of the same stalk and toward different heights or levels, according to the requirements—that is, according to the extent to which the cotton has opened on the stalk—thereby enabling the opened cotton to be gathered or picked clean from the field.

It has been proposed to employ pneumatic mechanism for use in connection with picking or gathering of cotton; but such mechanism embodies the objection of gathering and picking dried leaves, sticks, dirt, and the like along with the cotton, which, as above indicated, is a detriment, and is consequently objectionable and a result to be avoided.

In carrying out the principles of my invention I provide a machine adapted to be supported upon wheels and to be drawn or propelled through a field, and I arrange gathering or picking devices to be power actuated or driven and which are dirigible by an attendant carried by or seated on the machine, so as to be directed by the operator to the particular point where the opened bolls of cotton occur on a plant and which gathering or picking devices embody mechanism for picking and gathering cotton from the opened bolls, and associated with such devices I employ means for removing the gathered or picked cotton from the gathering or picking devices and for delivering the same into suitable receptacles arranged to receive it. It is obvious that many specifically-different constructions and arrangements of devices and apparatus may be devised for accomplishing these objects and purposes. While, therefore, I have shown and will now describe one construction and arrangement of apparatus embodying the above principles and mode of operation, I desire it to be understood that I do not limit or restrict myself nor the scope of my invention to the specific construction and arrangement of parts shown and now to be described.

Referring to the accompanying drawings, reference-signs A B designate the master or traction wheels of the machine adapted to operate along the ground and to support the framework of the machine and by the rotation thereof, due to the progression of the machine through the field or along the ground, to drive the various driven parts of the mechanism. To this end the wheels A B are journaled to rotate upon short stub-shafts C. Upon the outer end of each stub-shaft C is mounted or carried a yoke D, the upper ends of said yokes being arranged to support transversely-extending frame members E. Upon the inner end of each of the stub-shafts C is mounted a coöperating yoke or bracket F, the upper ends of which form additional supports for the transverse frame members E, and at the extreme upper ends of said yokes F is supported a transverse bracket G. If desired and in order to secure rigidity and strength of structure of the framework, each pair D F of yokes or supporting-brackets of the framing of the machine may be bolted or secured together in any convenient manner—as, for instance, by means of cross-braces H. If desired, longitudinally-extending brace-bars J are provided and bolted or otherwise secured to the inner frame brackets or yokes F and at their front ends to the draft-pole K and at their rear ends bolted together, as shown in Fig. 3.

L designates uprights or standards supported by the brace rods or bars J at their rear ends and by the tongue or pole K, in which and in coöperation with transverse bracket G are formed bearings to receive shafts M N.

O designates a transverse bar suitably supported upon the tongue K and carrying at the ends thereof hangers P, the other ends of said hangers being bolted, as seen in Fig. 2, to the yokes D and F, said hangers forming a platform or support Q, on which are carried seats R.

Journaled upon stub-axles C are arms S, extending rearwardly and carrying platforms T, upon which are carried seats V. The arms S extend forwardly from the stub-axles C, upon which they are hinged or pivoted, as indicated at W, (see Fig. 2,) and the front ends thereof are provided with lugs or engaging projections A', arranged to engage the yokes or brackets D F to form a limit-stop. From this construction it will be seen that the platforms T are suspended from the axles C, being prevented from rocking or tilting too far downwardly at the outward or rear ends thereof, but capable of being rocked or swung or tilted vertically for a purpose presently to be more fully explained.

The framework above described, it will be observed, is rigidly braced and secured together in all the parts thereof and in the manner explained and in such manner as to prevent relative vibration or movement of the parts thereof, and in accordance with the principles of my invention such framework is evenly balanced upon the stub-axles C, whereby the weight of the entire machine is taken upon such axles. The master or traction wheels A B are spaced a sufficient distance apart to enable the machine to straddle a row of cotton and to receive freely therebetween the cotton-stalks as the machine progresses lengthwise of the row, and the transverse frame bars or members E are raised a sufficient height to readily pass over the tops of the cotton-stalks, and a platform Q and a platform T are supported upon each side of the machine and in the vertical planes of the respective traction-wheels A B, so that as the machine progresses or advances through the field one wheel with its associated platforms Q T are on one side of the row of cotton-stalks and the other traction-wheel and its associated platforms Q T are on the other side of the row of cotton-stalks. It is evident that the frame members, brackets, and brace bars or rods may be of any suitable or convenient construction and arrangement suitable for securing the desired strength and rigidity without unduly increasing the weight of the machine as a whole.

B' designates a transversely-extending intermediate shaft and is suitably journaled in transverse bracket G. Loosely sleeved upon shafts B' are sprocket-gears C', over which operate driving-sprockets D', the latter operating over sprocket-gears E', mounted to rotate with the traction or master wheels A B. Each sprocket-gear D' is provided with a clutch member F', with which coöperates a clutch member G', mounted upon shaft B' to revolve therewith, but capable of sliding movement longitudinally upon said shaft, said sprocket members G' being yieldingly held in engaging relation with respect to the clutch member F' in any convenient manner—as, for instance, by means of springs H'. The object of this construction will be readily understood when it is considered that the rotations imparted to the master or traction wheels A B are transmitted through the sprocket-gears and sprockets above described to each end of shaft B'. When, however, the machine is turned, it is obvious that the outer wheel A or B, as the case may be, rotates at a higher rate of speed than the inner wheel, and by the provision of the slip-clutch construction above described compensation is made for the variations in the relative speeds of the wheels A B in turning without affecting the proper actuation of the transverse intermediate shaft B'. Mounted upon shaft B' is a bevel-gear J', arranged to mesh with and to drive bevel-gears K' on the adjacent ends of the longitudinal-shaft sections M N, as clearly shown in Figs. 1 and 2, whereby rotations are imparted to said shafts.

The construction so far described constituting the supporting-framework and driving mechanism it is obvious may be of very many specifically-different constructions and arrangements, the object being to secure a framework and driving mechanism which is simple and efficient and of the straddle-row order of machines capable of being operated, drawn, or propelled through a cotton-field in straddling relation with respect to a row of stalks and as clearly indicated in Fig. 3 and wherein power for actuating the gathering and picking mechanisms, presently to be described, is derived from the traction-wheels as the machine progressess or advances through the field, and by the arrangement of the supporting-platforms Q T on opposite sides of the straddled row it will be seen that provision is made for accommodating attendants for the gathering and picking mechanisms, so as to enable the gathering and picking operation to be carried on from opposite sides of the row. It will be evident, however, that any construction for securing a straddling of the row is included within the spirit and scope of my invention, nor is my invention to be limited or restricted to a straddle-row machine.

I will now describe the picking and gathering mechanisms, and as these mechanisms are substantially duplicates of each other the description of one will apply to all, these mechanisms being duplicated as often as may be necessary or desirable and according to the conditions to be encountered in the field. While, therefore, I have shown six sets of such mechanisms, three on each side of the machine, I do not desire to be limited or restricted in this respect, the important feature being to provide dirigible picking or gathering mechanisms each of which may be directed by an attendant from a seat R V on the platforms of the machine, so as to be caused to be brought into proper position with reference to each opened cotton-boll on a stalk. To this end the gathering and picking mechanism should be supported for universal movement in any desired direction, and in order to relieve the attendant or operator of unnecessary work such mechanisms should be properly counterweighted and should include means for picking or gathering the cotton from the opened bolls and delivering the same free from dust, dirt, twigs, dried leaves, or the like. In the accompanying drawings I have shown one construction of gathering or picking mechanism embodying these principles; but I do not desire to be limited or restricted to the exact details of construction and arrangement shown and now to be described.

Reference-sign L′ designates an arm suitably sleeved to rock freely in a vertical plane upon the longitudinal shafts N M and suitably counterweighted in any convenient manner—as, for instance, by the counterweight M′. Upon the outer or free end of arm L′ is mounted a sleeve N′ for axial movement through a desirable range of movement, as determined by transverse slots O′, formed in said sleeve N′, in which operate pins P′, carried by rod L′. The sleeve N′ is provided with forked arms Q′, carrying a stud or rod R′ in the outer free ends thereof, and bracket or casting having arms S′ T′ is mounted upon pin or rod R′, the arm S′ carrying a bracket or fitting $A^2$ and the arm T′ carrying a bracket or fitting $B^2$. In an extension $C^2$ of the bracket or fitting $B^2$ is mounted a rod or stud $D^2$, upon which is mounted a doffer-wheel $E^2$, the purpose and operation of which will presently be more fully described. The fittings or brackets $A^2$ $B^2$ form supports, respectively, for housings or casings $F^2 G^2$, the arrangement being such that one end of each of the housings $F^2 G^2$ is received in its respective bracket or casting $A^2 B^2$, the support of which afforded by the bracket having the arms S′ T′ is hinged or pivoted to rock or swing in a vertical plane upon stud or rod R′. At their free ends the housings or casings $F^2 G^2$ are carried in a bracket or casting $H^2$. $J^2$ designates an endless carrier operating over pulleys $K^2$, (see dotted lines in Fig. 5,) also mounted to rotate upon stud or rod R′, said belt or carrier also operating over a pulley $L^2$, carried by the bracket or casting $H^2$ at the free ends of housings or casings $F^2 G^2$. The belt or chain $J^2$ is arranged to operate through the housings or casings $F^2 G^2$, the wheel $L^2$ at the free ends of said housings or casings being so located and arranged as to expose the outer surface of the belt $J^2$ at the point where such belt travels around the periphery of such wheel. The pulley $K^2$ is driven in any suitable or convenient manner—as, for instance, through a drive-belt $M^2$, operating over pulleys $N^2 O^2$, respectively mounted on shaft N or M and stud or rod R′, rotation being imparted to shafts N or M, as above explained, by the movement of the machine through the field. The doffer $E^2$ is so arranged relative to the path of the belt $J^2$ as to operate to remove the cotton gathered or picked from the stalks by the belt $J^2$ and to deliver the same therefrom, as will presently appear more fully. To this end it is desirable to impart rotation to the doffer. This may be accomplished in any suitable or convenient manner—as, for instance, by means of a belt $P^2$, operating over pulleys $Q^2$ and $R^2$, respectively mounted upon studs or rods $D^2$ and R′, the pulley $R^2$ receiving rotation through the rotation of pulley $O^2$ and $K^2$ from the drive-pulley $N^2$ on shaft N or M, as the case may be. The belt $J^2$ is designed to pick or gather the cotton from the opened bolls on the cotton stalks or plants, and in order to facilitate the picking or gathering of the cotton I prefer to provide the belt $J^2$ with picking or gathering fingers or projections, (indicated at $S^2$, see Figs. 4 and 6,) and preferably these gathering or picking fingers are bent or pointed in the direction of movement or travel imparted to the belt and in the proper operation of the doffer $E^2$, and to facilitate the proper and efficient disengagement and delivery of the cotton gathered or picked by the gathering or picking belt I arrange the doffer to be so driven that the radial arms $T^2$ thereof wipe over the bent or pointed ends of the fingers $S^2$ during the rotation of such doffer at the point where the belt $J^2$ passes around its drive-pulley $K^2$ and in the same direction as that of the travel of the belt at this point, and consequently in the same direction as the bent or pointed portions of the gathering or picking fingers $S^2$; but I drive the doffer at a higher speed than the speed of travel of the belt $J^2$, thereby enabling the cotton gathered or picked by the belt $J^2$ to be removed from the picking-fingers $S^2$ thereof and delivered from such belt, and I arrange a suitable receptacle (indicated at $A^3$) in convenient position to receive the material thus delivered from the gathering or picking belt by the doffer. It is obvious that any suitable or convenient form of receptacle to receive the cotton may be employed, that shown comprising a canvas or other form of receptacle, including standards $B^3$, carried by the machine frame or carrier and supporting a rod $C^3$, to which is connected one edge of the canvas or other material constituting the receptacle, the other edge of said canvas or receptacle material being connected to the frame of the machine.

From the foregoing description it will be seen that the gathering or picking mechanism, and including the gathering or picking belt $J^2$ with its picking-fingers, is supported or mounted for substantially universal movement, the arm $L'$ swinging freely in a vertical plane and being counterbalanced and the housings $F^2 G^2$ being supported upon the stud or rod $R'$, carried in the forked ends $Q'$ of sleeve $N'$. The latter rocking axially upon the free end of rod $L'$ affords a universal mounting of the gathering device, enabling such device to be dirigible by an attendant grasping the housings $F^2 G^2$, and during such manipulation of the picking or gathering device by the attendant the attendant is protected against contact with the gathering or picking belt by reason of the latter traveling through the housings $F^2 G^2$. In practice I prefer to employ tubular housings $F^2 G^2$; but in this respect I do not desire to be limited or restricted. In practice the housing $G^2$ is of larger diameter or internal area than the housing $F^2$, as said housing receives the return leg or run of the belt from the sheave $S^2$, where the belt receives the cotton picked or gathered from the opened bolls on the stalk, and hence is required to accommodate or to form a passage through which the gathered cotton is delivered to the action of the doffer-roll, and the housing $F^2$ serves merely as a return-conduit in which operates the other leg or run of the belt.

It will be readily seen that not only is the picking or gathering device readily dirigible by an attendant to any desired point of a cotton stalk or plant to gather or pick the opened cotton, but that in such operation the attendant or operator manipulating the gathering or picking mechanism is enabled to avoid injury to the cotton stalk or plant or to any unopened boll which may be carried thereon. It will also be observed that the operator is relieved of the work of supporting the gathering mechanism, since the latter is efficiently counterweighted, so that the entire attention of the operator may be devoted to directing the gathering or picking mechanism to the proper points to gather or pick only the opened cotton from the stalk.

If desired and in order to take up any looseness or slack of the belt $J^2$, the pulley or sheave $L^2$ may be suitably mounted with reference to fitting or casting $H^2$. To this end said pulley is carried upon a block $D^3$, which is suitably mounted upon block or fitting $H^2$ and spring-pressed in any convenient manner—as, for instance, by being held under the tension of spring $E^3$.

As above indicated, I have described the construction and arrangement of only one of the gathering mechanisms employed on the machine. Where the machine employs a plurality of such gathering or picking mechanisms, as in the instance shown in the drawings, each picking or gathering mechanism is a duplicate of the others, and therefore the description of one will apply to all. In the particular form shown, to which, however, my invention is to be in no wise limited or restricted, I employ three sets of gathering or picking mechanisms on each side of the machine, the purpose being to enable operators or attendants to apply the gathering or picking devices from opposite sides of the cotton-stalks contained in a row, along which row the machine progresses, each operator taking a certain part of the stalk—as, for instance, by one set comprising a pair of each member arranged on one side of the machine taking the upper part of the stalk, the next pair taking or operating on the middle portion of the stalk, and the last pair operating on the lower portion of the stalk—thus insuring the clean picking or gathering of the cotton as the machine progresses through the field. It will be observed that since the operation of the picking devices is dependent upon the advancement of the machine through the field the gearing should be so proportioned as that the gathering or picking devices will be operated at a comparatively high rate of speed as compared with the speed of progress or progression of the machine through the field, and as the machine progresses slowly through the field the operators carried by the machine are enabled to readily direct the gathering devices to the points where the cotton is opened and without doing injury to the stalk or plant or to any unopened bolls. It will also be seen that the machine does not depend entirely upon the automatic action of the machine in bringing the gathering or picking devices into contact with the cotton indiscriminately; but each gathering or picking device is directed by the skill of the operator to the particular points where occurs an opened boll on the stalk or plant. The machine thus serving as a carrier on which the various operating parts are mounted may be progressed or propelled through the field in any suitable or convenient manner. Since, however, the framing is raised a sufficient height to accommodate a row of cotton-stalks thereunder and between the wheels of the machine and since it is desirable to apply the draft for advancing the machine through the field to the frame on a substantially horizontal level of the axles of the traction-wheels, I propose to attach the swingletrees F³ to a draft-chain or other suitable connection G³, arranged to operate over a pulley H³, suitably mounted upon the tongue K of the machine-frame, the ends of such chain passing downwardly from such pulley H³ and over guides J³, carried by the uprights P, the guides J³ being located in or adjacent to the horizontal plane containing the axles C of the traction-wheels.

The operation of the machine will be readily understood from the foregoing description and is as follows: The machine-frame construction braced and balanced as above explained and serving as a carrier is supported by the traction-wheels A or upon the stub-axles C thereof, the wheels straddling the row along which the machine is to operate. By progressing the machine through the field rotation is imparted to the supporting and traction wheels, thereby imparting rotation to the longitudinal shafts N M through the sprocket-chains D' operating over the sprocket-wheels E' and C'. Rotation imparted through the sprockets E' to sprockets C' imparts rotation to the intermediate shaft B', on which is mounted the bevel-gear J', through which is driven the shafts N M. The pulleys N², mounted upon shafts N M, impart, through the belts M², rotation to the pulleys K², through which the gathering-belts J² are driven, and also to the doffers E². The operators seated upon the carrier grasp the housings or casings F² or G², as may be convenient, and as the machine progresses through the field direct the free ends of the gathering or picking mechanisms—that is, the ends where the gathering-chains J² are exposed to the proper points on the stalk or stalks for the belts J² to be brought into contact with the opened cotton—thereby quickly withdrawing the cotton from the bolls and progressing the same through the housing J² to the point where the doffer E² operates to detach the gathered cotton from the gathering or picking belts and deliver the same therefrom into the receptacle A³. In this work the operator is relieved of the work of supporting the gathering or picking mechanisms by reason of the counterbalanced construction thereof, and since said gathering or picking mechanisms are mounted or supported for universal movement the operator is enabled to direct the exposed part of the gathering-belt to any desired point to efficiently and cleanly pick and gather the cotton from the stalk as the machine progresses through the field and to deliver the same into a suitable receptacle carried by the carrier.

From the foregoing description it will be seen that I provide an exceedingly simple and efficient cotton picking or gathering machine and wherein I employ dirigible cotton picking or gathering devices capable of being directed according to the skill of the attendant so as to be presented only to the opened cotton on the stalks or plants and whereby the danger is avoided of injuring or breaking down the plant or stalk or of breaking off unopened bolls from the stalk. It will also be seen that I provide a machine wherein the attendant is enabled to avoid picking or gathering of any twigs or dried leaves; but even if such leaves or twigs should be gathered or picked from a stalk in the operation of the device the rapid rotation of the doffer serves to create an automatic draft of air to disengage and remove the dried leaves, twigs, or the like from the cotton, thereby delivering the cotton into the receptacles A³ comparatively free from such accumulation of twigs or dried leaves, and hence in a condition commanding a higher price in the market than would otherwise be the case. It will also be seen that in the use of a machine embodying the principles of my invention a cotton-field may be gone over repeatedly, so that as rapidly as the cotton opens on the stalk it may be gathered or picked therefrom, thereby avoiding the exposure of the opened cotton for an undue length of time to the elements, where it is liable to be detached from the opened bolls by wind or rain, while at the same time any unopened bolls are left uninjured and intact upon the stalks for the cotton to be gathered therefrom at a subsequent date, and consequently enabling the farmer to gather or pick the entire crop produced and without loss through a failure to pick or gather all of the cotton produced by each stalk or plant. It will also be seen that I provide a machine which enables an entire cotton-field to be gone over with comparative rapidity, thereby saving time and consequent expense as well as enabling the farmer to gather or pick his cotton when it is in the best possible condition for the market.

As above indicated, it is obvious that many variations and changes in the details of construction and arrangement would readily occur to persons skilled in the art and still fall within the spirit and scope of my invention. I do not desire, therefore, to be limited or restricted to the exact details of construction and arrangement shown and above described; but, Having now set forth the object and nature of my invention and a construction embodying the principles thereof, what I claim as new and useful and of my own invention, and desire to secure by Letters Patent, is—

1. In a cotton-picking machine, the combination with a carrier adapted to transport one or more persons, of one or more picking mechanisms, and mounted thereon to have movement in different planes under the direction of the operator; for the purpose set forth.

2. In a cotton-picking machine, the combination with a carrier, of one or more picking mechanisms mounted thereon upon a practically universal joint; whereby it may be moved in different planes under the direction of the operator.

3. In a cotton-picking machine, the combination with a carrier, of one or more picking mechanisms mounted thereon to have movement in different planes and be directed by the operator, and means for actuating such picking mechanisms geared to the traction-wheels of the carrier for the purpose set forth.

4. In a cotton-picking machine, the combination with a carrier, of a counterbalanced picking or gathering mechanism mounted thereon for universal movement, and means for operating said mechanism, as and for the purpose set forth.

5. In a cotton-picking machine, the combination with a carrier, and a shaft carried thereby, of picking and gathering devices suspended from said shaft upon a joint permitting movement in different planes, and means for actuating such devices, as and for the purpose set forth.

6. In a cotton-picking machine, the combination with a carrier, a shaft journaled thereon, and means for driving said shaft, of picking or gathering devices suspended from said shaft upon a practically universal joint, and gearing actuated by said shaft for operating said picking or gathering devices, as and for the purpose set forth.

7. In a cotton-picking machine, a carrier, an arm pivotally mounted upon said carrier, picking or gathering devices pivotally mounted upon said arm, and means for actuating said devices, as and for the purpose set forth.

8. In a cotton-picking machine, a carrier, an arm pivotally mounted thereon, picking or gathering devices mounted upon said arm for rocking movement axially relative thereto, and means for operating said picking or gathering devices, as and for the purpose set forth.

9. In a cotton-picking machine, a main frame, an arm pivotally mounted thereon, a sleeve mounted for rocking movement upon said arm, picking or gathering devices carried by said sleeve, and means for operating the same, as and for the purpose set forth.

10. In a cotton-picking machine, a main frame, picking or gathering mechanism, a rocking support therefor upon which said picking or gathering mechanism is pivotally mounted, and means for actuating said picking or gathering devices, as and for the purpose set forth.

11. In a cotton-picking machine, a main frame, an arm pivotally mounted thereon, a sleeve mounted upon said arm for axial movement relative thereto, and picking or gathering devices pivotally supported upon said sleeve, as and for the purpose set forth.

12. In a cotton-picking machine, a main frame, a counterbalanced arm pivotally mounted thereon, an axially-movable sleeve carried by said arm, and picking or gathering devices supported by said sleeve, as and for the purpose set forth.

13. In a cotton-picking machine, a main frame, a counterbalanced arm pivotally mounted upon said frame, a sleeve mounted on said arm for axial movement relatively thereto, cotton picking or gathering devices pivotally supported by said sleeve, and gearing for actuating said cotton picking or gathering devices, as and for the purpose set forth.

14. In a cotton-picking machine, a main frame, a shaft mounted thereon, an arm sleeved upon said shaft for rocking movement relatively thereto, a stud supported at the free end of said arm, cotton picking or gathering devices hinged or pivoted upon said stud, and drive-gears concentric with said shaft and stud for operating said cotton picking or gathering devices, as and for the purpose set forth.

15. In a cotton-picking machine, a main frame, a shaft mounted thereon, a counterbalanced arm sleeved upon said shaft, a stud supported at the free end of said arm, cotton picking or gathering devices pivoted upon said stud, and gears concentric with said shaft and stud for actuating said cotton picking or gathering mechanism, as and for the purpose set forth.

16. In a cotton-picking machine, a main frame, a shaft mounted thereon, an arm sleeved upon said shaft, a sleeve mounted for axial movement upon said arm, a stud carried in the free end of said sleeve, and cotton picking or gathering devices pivoted upon said stud, as and for the purpose set forth.

17. In a cotton-picking machine, a main frame, a shaft mounted thereon, a counterbalanced arm sleeved upon said shaft, a sleeve mounted for axial movement upon the free end of said arm, a stud carried by said sleeve, cotton picking or gathering mechanism pivotally supported upon said stud, and gears concentric with said shaft and stud for operating said cotton picking or gathering mechanism, as and for the purpose set forth.

18. In a cotton-picking machine, the combination with a carrier adapted to transport one or more persons, picking or gathering mechanism including an endless belt, and a housing or casing in which said belt operates, said housing or casing mounted for universal movement upon the carrier, and means for actuating said belt, as and for the purpose set forth.

19. In a cotton-picking machine, the combination with a carrier adapted to transport one or more persons, picking or gathering mechanism including an endless traveling belt, a housing in which said belt operates, said housing or casing mounted for universal movement upon the carrier, means for actuating said belt, and means for removing the gathered or picked cotton from such belt, as and for the purpose set forth.

20. In a cotton-picking machine, dirigible picking or gathering mechanism, including an endless traveling belt, means for driving said belt, a housing or casing in which said belt operates, said housing or casing mounted for universal movement, and a counterweight for such housing or casing, as and for the purpose set forth.

21. In a cotton-picking machine, a counterbalanced dirigible picking or gathering mechanism mounted to have a movement in different planes, including a traveling belt, a support therefor, and means for operating said belt, as and for the purpose set forth.

22. In a cotton-picking machine, picking or gathering mechanism, a stud upon which said mechanism is pivotally mounted, and means for supporting said stud for universal movement, as and for the purpose set forth.

23. In a machine for picking cotton, cotton picking or gathering mechanism, a support therefor, including a rocking or swinging arm, a sleeve mounted thereon, and a pin-and-slot connection between said sleeve and arm to permit axial movement of said sleeve relative to said arm, as and for the purpose set forth.

24. In a cotton-picking machine, picking or gathering devices, a support therefor, including a counterbalanced swinging arm, a sleeve carried thereby, and a pin-and-slot connection between said sleeve and arm for axial movement of said sleeve relative to said arm whereby said picking and gathering mechanism is supported for universal movement, as and for the purpose set forth.

25. In a cotton-picking machine, picking or gathering mechanism, including a traveling belt, a drive-pulley over which said belt operates, a fitting or casting pivotally mounted on the axis of rotation of said pulley and provided with an extension, a housing carried by said fitting or casting through which said belt operates, and a doffer mounted upon said extension, and means for driving said pulley and doffer, as and for the purpose set forth.

26. In a cotton-picking machine, a picking or gathering mechanism, including a belt carrying picking-fingers, a drive-pulley and a guide-pulley over which said belt operates, a pair of housings or casings pivotally supported concentric with the axis of said drive-pulley, a fitting carried by the other ends of said housings, said fitting forming a support for said drive-pulley, said belt operating through said housings, as and for the purpose set forth.

27. In a cotton-picking machine, a main frame, a shaft journaled thereon, one or more dirigible cotton picking or gathering mechanisms freely suspended from said shaft for universal movement, gearing driven from said shaft for operating said picking or gathering mechanism, and gearing actuated by the advancement of the machine through the field for driving said shaft, as and for the purpose set forth.

28. In a cotton-picking machine, a main frame, a plurality of independent dirigible cotton picking or gathering mechanisms, each freely mounted upon said frame for universal movement, and a counterbalance for each of said devices or mechanisms, as and for the purpose set forth.

29. In a machine for picking cotton, a main frame, a platform supported thereon, and a counterbalanced dirigible cotton picking or gathering mechanism supported upon said main frame adjacent to said platform and mounted thereon for universal movement whereby such mechanism may be directed from such platform, as and for the purpose set forth.

30. In a cotton-picking machine, a main frame, platforms supported upon opposite sides of said main frame to accommodate a row of cotton-stalks therebetween and adapted to support operators, an independent picking or gathering mechanism mounted upon said main frame by a practically universal joint adjacent to each of said platforms, whereby picking or gathering devices may be applied to opposite sides of the same stalk as the machine progresses through the field and operated from such platforms, as and for the purpose set forth.

31. In a cotton-picking machine, a main frame, platforms adapted to support operators arranged on opposite sides of said frame, dirigible picking or gathering mechanism supported upon said main frame by a practically universal joint and adjacent to each of said platforms, and a common means for driving said mechanisms, whereby said mechanisms may be directed from said platforms, as and for the purpose set forth.

32. In a cotton-picking machine, a main frame, a pair of traction-wheels upon which said frame is supported, said wheels being spaced apart a distance sufficient to straddle a row of cotton-stalks, platforms supported on opposite sides of the main frame, counterbalanced dirigible picking or gathering mechanisms mounted upon said main frame for universal movement and each adapted to be directed from a platform, as and for the purpose set forth.

33. In a cotton-picking machine, picking or gathering mechanism mounted for universal movement, whereby said mechanism is dirigible, means for operating said mechanism to gather or pick cotton from the stalks, means for detaching the gathered or picked cotton from such mechanisms, and a receptacle arranged to receive the cotton from said picking and gathering mechanism, as and for the purpose set forth.

34. In a machine for picking cotton, a main frame, dirigible picking or gathering mechanism carried thereby, and a platform hinged or pivoted upon said main frame toward its forward end whereby it may be tilted upward, as and for the purpose set forth.

35. In a cotton-picking machine, a main frame, a platform hinged or pivoted thereon for tilting movement, a picking or gathering mechanism mounted for universal movement upon said main frame and adjacent to said platform, whereby said mechanism is dirigible from said platform, and a stop device for limiting the rocking movement of said platform upon its pivotal support, as and for the purpose set forth.

In witness whereof I have hereunto set my hand, this 8th day of April, 1904, in the presence of the subscribing witnesses.

GEORGE A. LOWRY.

Witnesses:
GEORGE C. C. CONET,
HOUSTON MANN.